Sept. 17, 1963 R. H. BRONLEEWE 3,103,980
SPRING TOOTH HARROWS
Filed May 6, 1960 3 Sheets-Sheet 1
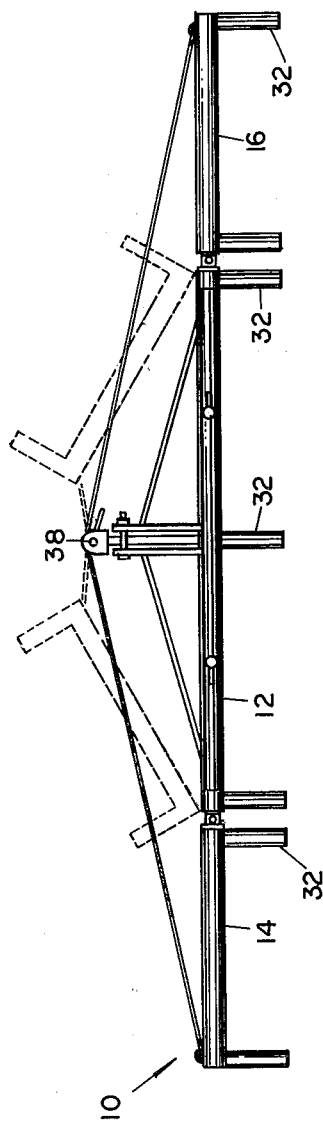
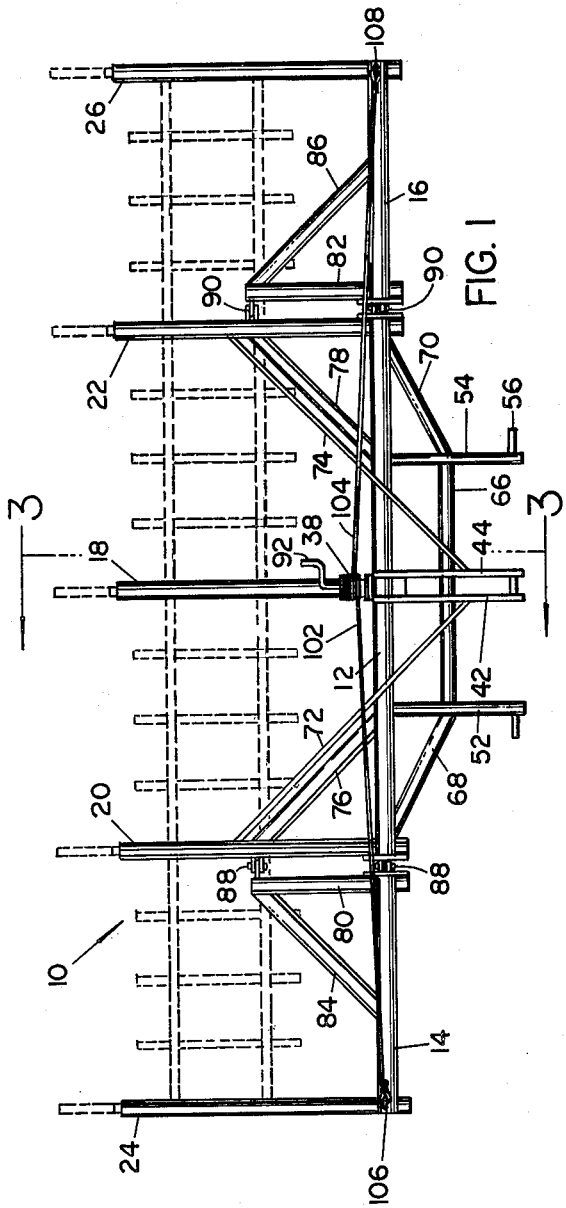
INVENTOR.
ROBERT H. BRONLEEWE

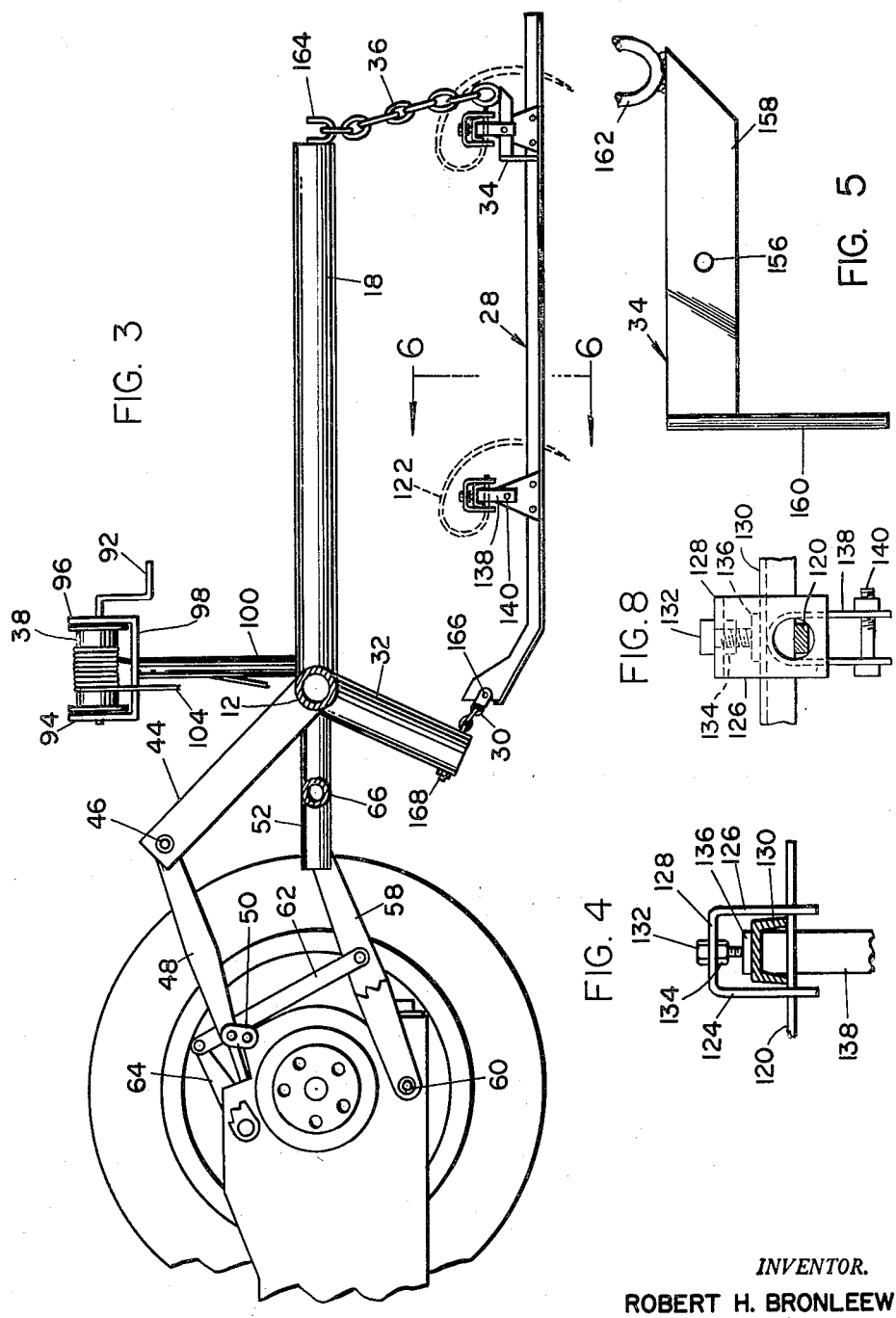

Sept. 17, 1963   R. H. BRONLEEWE   3,103,980
SPRING TOOTH HARROWS
Filed May 6, 1960   3 Sheets-Sheet 3
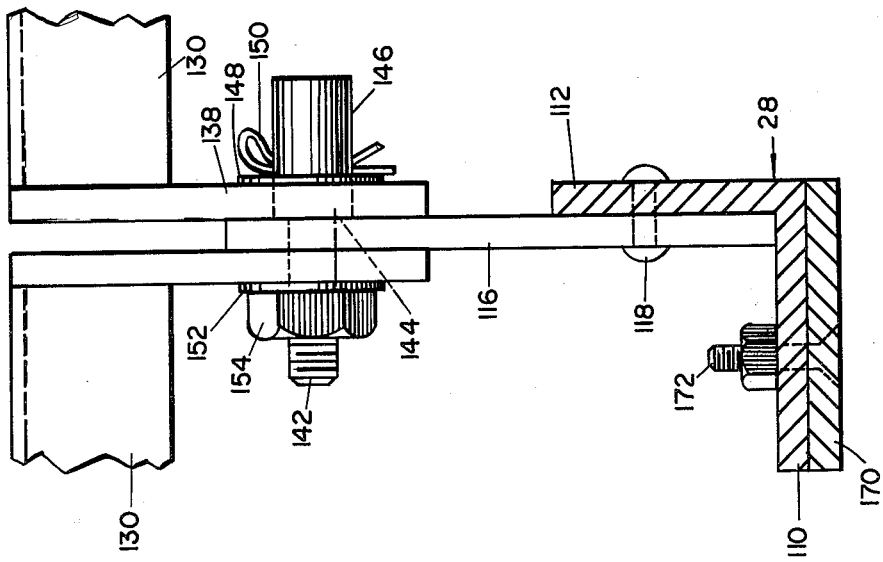
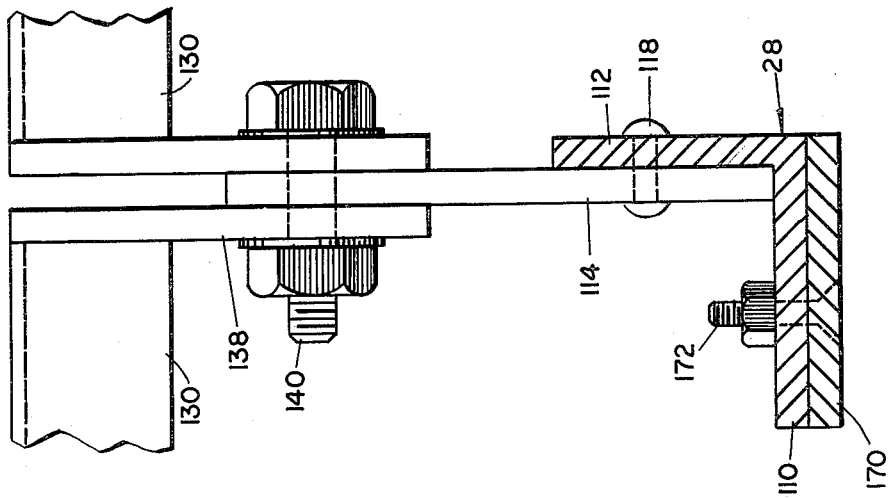
INVENTOR.
ROBERT H. BRONLEEWE 3,103,980
SPRING TOOTH HARROWS
Robert H. Bronleewe, R.R. 2, Geneseo, Kans.
Filed May 6, 1960, Ser. No. 27,298
3 Claims. (Cl. 172—390)

This invention relates to agricultural implements and particularly cultivators, and in particular a spring tooth harrow in which the spring teeth are mounted by channel bars on runners connected by chains to depending legs of a transverse beam at the leading ends, and by lift chain brackets and chains at the opposite ends to trailing ends of arms extended rearwardly from said transverse beam, and in which hinged end sections of the harrow are drawn upwardly by winches to folded positions on the harrow frame to facilitate passing through gates in being transported from one field to another.

The purpose of this invention is to provide a spring tooth harrow having folding end sections and in which the spring teeth are carried by runners loosely connected to the frame of the harrow so that the runners are free to follow the surface of the ground.

Heretofore connecting trailing ends of runners of spring tooth harrows to supporting elements has been a problem as the runners follow the surface of the ground and, consequently, connecting elements thereof are continuously expanding and contracting. After years of experimenting the improved lift chain bracket of this invention was developed and by using the improved bracket the supporting chain is connected to the end of a lever pivotally mounted by a bearing on the runner and in which the opposite end of the lever is connected to the runner by a rod.

Furthermore, disconnecting end sections of a spring tooth harrow to facilitate passing through a gate in transporting a harrow from one field to another requires removing six bolts and removing and replacing these bolts necessitates twelve operations. It is, therefore, an object of this invention to provide an improved type of coupling bolt in which a cotter pin is provided whereby sections of the harrow may be connected and disconnected as desired.

Another object of the invention is to provide means for mounting the teeth of a spring tooth harrow on runners that travel on the surface of the ground whereby the teeth are clamped to the mounting elements of the runners.

Another important object of the invention is to provide a lift chain bracket for connecting chains of supporting arms to trailing ends of runners on which spring teeth are positioned whereby the runners are free to follow the surface of the ground.

A further object of the invention is to provide means for mounting a manually actuated winch on a spring tooth harrow having hinged end sections whereby the end sections are drawn to folded positions upon the harrow by the winch.

It is yet another object of the invention to provide a three point suspension for the hitch and other parts of a spring tooth harrow.

A further object of the invention is to provide a spring tooth harrow in which the teeth are mounted on runners in such a manner that only one runner is required for each section.

A still further object of the invention is to provide an improved spring tooth harrow construction in which the harrow is of simple and economical construction.

With these and other objects and advantages in view the invention embodies a transverse beam having hinged end sections with a hitch for connecting the harrow to a tractor, with spring tooth carrying runners suspended by chains from arms extended rearwardly from the beam and end sections thereof, and with a winch mounted on the harrow and having cables connected to the end sections of the transverse beam for drawing the end sections upwardly to folded positions on the harrow.

Other features and advantages of the invention will appear from the following description taken in connection with the drawings, wherein:

FIGURE 1 is a plan view of the improved spring tooth harrow the frame members of which are shown in full lines, and the spring teeth and mounting bars thereof in dotted lines.

FIGURE 2 is a front elevational view of the harrow showing the end sections thereof extended in full lines and folded upon the harrow in dotted lines.

FIGURE 3 is a cross section through the harrow, taken on line 3—3 of FIGURE 1, showing the connection of the harrow to a tractor, and the mounting of the spring tooth carrying runners on the harrow, and in which the parts are shown on an enlarged scale.

FIGURE 4 is a section similar to that shown in FIGURE 3, with the parts shown on an enlarged scale, showing the clamping elements of the spring tooth mountings with other parts omitted.

FIGURE 5 is a side elevational view of one of the lift chain brackets, with the parts shown on an enlarged scale, and with other parts omitted.

FIGURE 6 is a cross section through one of the runners of the harrow, taken on line 6—6 of FIGURE 3, showing connections of channel bars to bearings of the runners, and with the parts shown on an enlarged scale.

FIGURE 7 is a section similar to that shown in FIGURE 6 showing a mounting of a lift chain bracket on the extended end of a runner.

FIGURE 8 is a side elevational view of the spring tooth mounting particularly as shown in FIGURE 4.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a central beam positioned transversely of the harrow and disposed centrally between the sides of the harrow, numerals 14 and 16 end sections aligned with the beam and hinged to ends of the harrow, numeral 18 an arm extended rearwardly from the center of the beam, numerals 20 and 22 indicating arms extended rearwardly from ends of the beam, numerals 24 and 26 arms extended rearwardly from extended ends of the sections of the beam, numeral 28 runners positioned below the arms and connected, at the leading ends, by chains 30 to legs 32 depending from the beam and end sections 14 and 16 thereof, and, at the trailing ends, by lift chain brackets 34 and chains 36 to the trailing ends of the arms, and numeral 38 a winch extended above the beam and having cables extended therefrom to said end sections of the beam.

The beam 12 is connected to the power take-off a tractor by spaced bars 42 and 44 secured, such as by welding, to the beam and connected by a pin 46 to an arm 48 extended from a link 50. The beam 12 is also provided with rod 52 and 54 which are connected by pins 56 to lower arms 58, connected to the rear axle housing of the tractor by bolts 60. The arms 58 are connected by links 62 to power lift arms 64 of the tractor.

The rods 52 and 54 are reinforced by an intermediate bar 66 and diagonal braces 68 and 70. The bars 42 and 44 are also reinforced by braces 72 and 74.

The arms 20 and 22, extended rearwardly from the extended ends of the beam 12 are reinforced by diagonal braces 76 and 78, and the end sections 14 and 16 of the beam are provided with struts 80 and 82 which are reinforced by braces 84 and 86.

The end section of the harrow frame, including the section 14 and the arm 24 is hinged to the arm 20 by hinges 88, and the section at the opposite end is connected by hinges 90 to the arm 22.

The winch 38, which is provided with a hand crank 92, is rotatably mounted in ends 94 and 96 extended upwardly from a base 98, and the base is mounted on the upper end of a post 100 extended upwardly from the beam 12. Cables 102 and 104, which are trained on the drum of the winch, extend laterally with the cable 102 connected to the arm 24 at the point 106, and the cable 104 connected to the arm 26 at the point 108.

The runners 28 are L-shaped in cross section having horizontally disposed bases 110 with vertically positioned flanges 112 and the spring teeth are mounted on bearing plates 114 and 116 secured to the flanges 112 by rivets 118. Shanks 20 of the spring teeth 122 extend through openings in lower parts of arms 124 and 126 of U-shaped clips 128 which are positioned over channel bars 130, and the shanks 120 are clamped against lower edges of the flanges of the channel bars by bolts 132 having lock nuts 134 thereon and positioned to bear against discs 136. The channel bars 130 are secured by brackets 138 which are mounted on the bearing plates by bolts 140, in the design shown in FIGURE 6, or by studs 142, as illustrated in the design shown in FIGURE 7. In FIGURE 7 a threaded stud 142 extends from a shoulder 144 of a head 146, and the head is provided with a washer 148 and a cotter pin 150. The stud is provided with a washer 152 and a nut 154.

The spring tooth mountings at the trailing ends of the runners are provided with lift chain brackets 34 which are mounted on the studs 142 that extend through openings 156 in horizontally disposed arms 158 of the brackets. The inner ends of the brackets are supported by rods 160 and lower links 162 of the chains 36 are secured to trailing ends of the arms 158 by welding or the like. The upper ends of the chain 36 are placed over hooks 164 on the trailing ends of the arms extended from the transverse beam and end section thereof.

The chains 30 connecting the leading ends of the runners to the legs 32 are secured to the flanges of the runners by bolts 166 and to the struts by eyebolts 168.

With the chains connecting the leading and trailing ends of the runners to the harrow frame a floating mounting is provided and the runners carry the spring teeth upwardly and downwardly to compensate for the uneven surface of the soil as the harrow travels forwardly.

In traveling from one field to another, or through gates, or in transportation on a highway, the end sections are elevated to folded positions on the harrow, as shown in FIGURE 2, in which the folded positions are indicated by dotted lines, by the winch.

The runners 28 are conventional, and the caps or shoes 170, which are secured to the bases 110 by bolts 172, are also conventional.

From the foregoing specification it will become apparent that the invention disclosed will adequately accomplish the functions for which it has been designed and in an economical manner, and that its simplicity, accuracy, and ease of operation are such as to provide a relatively inexpensive device considering what it will accomplish and that it will find an important place in the art to which it appertains when once placed on the market.

It is thought that persons skilled in the art which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice if desired.

Having now described the invention that which is claimed to be new and desired to be procured by Letters Patent, is:

1. In a spring tooth harrow, the combination which comprises a central transverse beam, end beam sections aligned with said central tranverse beam, hinged to and extended from the ends of the beam, an arm extended rearwardly from the center of said central transverse beam and normal thereto, parallel arms extended rearwardly from the ends of the central transverse beam and normal to said beam, an arm extended rearwardly from the outer end of each of said end beam sections and normal to said sections, diagonal braces extended from points intermediate of the length of said central transverse beam to points substantially midway of the length of said parallel arms at the ends of said central transverse beam, struts extended rearwardly from inner ends of said end beam sections of the central transverse beam and parallel to said arms, diagonal braces extended from intermediate portions of said end beam sections to trailing ends of said struts, hinges connecting trailing ends of the struts to said parallel arms at the ends of said central transverse beam, spaced parallel rods extending forwardly from said central transverse beam, means on the forward ends of said parallel rods for connecting said forward ends to a vehicle, depending legs extended angularly from said central transverse beam, a similar leg extended angularly from each of said end beam sections, spaced parallel longitudinally disposed runners positioned below said depending legs, flexible means interconnecting forward ends of said runners and said depending legs to pull said runners, spaced bearing plates mounted on and extended upwardly from said runners, spring harrow teeth mounted on said bearing plates by means comprising U-shaped clips and channel bars, and means comprising elongated flexible means connecting trailing ends of said runners to trailing ends of the arms extended from said central transverse beam and said end beam sections, and means for drawing said end beam sections, runners and spring teeth thereof upwardly upon the harrow.

2. A spring tooth harrow as described in claim 1 wherein the means for drawing the end sections upwardly upon the harrow includes a post extended upwardly from said central transverse beam, a winch carried by said post, and cables extending from said winch and connected to said end beam sections.

3. In combination with a spring tooth harrow as described in claim 1 in which said teeth mounting means further comprises means for pivotally mounting said channel bars for supporting said spring teeth on said bearing plates.

References Cited in the file of this patent

UNITED STATES PATENTS

| 1,923,930 | Johnson et al. | Aug. 22, 1933 |
| 2,599,251 | Garrett | June 3, 1952 |
| 2,655,854 | Warne | Oct. 20, 1953 |
| 2,746,370 | Altgelt | May 22, 1956 |
| 2,889,890 | Bronleewe | June 9, 1959 |

FOREIGN PATENTS

| 1,176,046 | France | Nov. 17, 1958 |